(12) United States Patent
Burry et al.

(10) Patent No.: US 9,741,249 B2
(45) Date of Patent: Aug. 22, 2017

(54) AUTOMATED PROCESSING METHOD FOR BUS CROSSING ENFORCEMENT

(75) Inventors: Aaron M. Burry, Ontario, NY (US); Raja Bala, Pittsford, NY (US); Zhigang Fan, Webster, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 1181 days.

(21) Appl. No.: 13/210,447

(22) Filed: Aug. 16, 2011

(65) Prior Publication Data
US 2013/0044219 A1 Feb. 21, 2013

(51) Int. Cl.
H04N 7/18 (2006.01)
G08G 1/017 (2006.01)
G06K 9/32 (2006.01)

(52) U.S. Cl.
CPC ........... *G08G 1/0175* (2013.01); *G06K 9/325* (2013.01); *G06K 2209/15* (2013.01)

(58) Field of Classification Search
CPC .......... H04N 7/18; G06K 9/20; G08G 1/0175; G08G 1/017; G08G 1/015; G08G 1/054
USPC ......................................................... 348/149
See application file for complete search history.

(56) References Cited

U.S. PATENT DOCUMENTS

| | | | | |
|---|---|---|---|---|
| 5,382,953 A * | 1/1995 | Hauptli | | 340/937 |
| 5,510,764 A * | 4/1996 | Hauptli | | 340/433 |
| 5,570,127 A * | 10/1996 | Schmidt | | 348/148 |
| 6,240,217 B1 * | 5/2001 | Ercan et al. | | 382/274 |
| 6,411,328 B1 * | 6/2002 | Franke et al. | | 348/149 |
| 6,466,260 B1 * | 10/2002 | Hatae et al. | | 348/149 |
| 6,512,537 B1 * | 1/2003 | Shimizu et al. | | 348/155 |
| 6,754,369 B1 * | 6/2004 | Sazawa | | 382/105 |
| 6,950,789 B2 * | 9/2005 | Laird et al. | | 703/8 |
| 6,985,172 B1 * | 1/2006 | Rigney et al. | | 348/149 |
| 7,072,398 B2 * | 7/2006 | Ma | | 375/240.16 |
| 7,633,382 B2 * | 12/2009 | Bowler | | 340/433 |
| 7,812,711 B2 * | 10/2010 | Brown et al. | | 340/426.18 |
| 7,920,959 B1 * | 4/2011 | Williams | | 701/117 |
| 7,986,339 B2 * | 7/2011 | Higgins | | 348/149 |
| 2004/0239817 A1 * | 12/2004 | Jain et al. | | 348/722 |
| 2006/0210175 A1 * | 9/2006 | Huang et al. | | 382/232 |
| 2006/0269104 A1 * | 11/2006 | Ciolli | | 382/104 |
| 2006/0269105 A1 * | 11/2006 | Langlinais | | 382/105 |
| 2008/0157945 A1 * | 7/2008 | Bowler | | 340/433 |

(Continued)

*Primary Examiner* — Francis G Geroleo
(74) *Attorney, Agent, or Firm* — Fay Sharpe LLP

(57) ABSTRACT

As set forth herein, systems and methods are described that facilitate to analyze a video stream from a camera mounted on the side of a school bus, wherein a sub-set of video sequences showing cars illegally passing the stopped school bus are automatically identified through image and/or video processing. The described systems and methods provide a significant savings in terms of the amount of manual review that is required to identify such violations. The video sequences also can be analyzed further to additionally produce images of the license plate (for identification of the violator), thereby providing further reduction in required human processing and review time. In one embodiment, automatic license plate recognition (ALPR) is employed to identify text on the violator's license plate, as well as the state by which the license plate was issued, without requiring human review of the license plate image.

15 Claims, 5 Drawing Sheets
(1 of 5 Drawing Sheet(s) Filed in Color)

(56) References Cited

U.S. PATENT DOCUMENTS

| | | | |
|---|---|---|---|
| 2008/0166023 A1* | 7/2008 | Wang | 382/107 |
| 2009/0136141 A1* | 5/2009 | Badawy | G06F 17/30781 382/225 |
| 2009/0195651 A1* | 8/2009 | Leonard et al. | 348/148 |
| 2010/0128127 A1* | 5/2010 | Ciolli | 348/143 |
| 2011/0135156 A1* | 6/2011 | Chen et al. | 382/105 |
| 2012/0051431 A1* | 3/2012 | Chien et al. | 375/240.16 |
| 2012/0307064 A1* | 12/2012 | Schenken et al. | 348/149 |

\* cited by examiner

AUTOMATED PROCESSING METHOD FOR BUS CROSSING ENFORCEMENT

TECHNICAL FIELD

The present exemplary embodiments broadly relate to detecting moving vehicles that illegally pass a stopped vehicle. They find particular application identifying vehicles that illegally pass a stopped school bus. However, it is to be appreciated that the present exemplary embodiments are also amenable to other like applications.

BACKGROUND

Conventional systems for identifying a vehicle that illegally passes a stopped school bus utilize a video camera mounted to the side of the bus. The camera is typically triggered based on the "STOP" sign on the side of the bus being deployed. Video sequences are therefore recorded for each stop of the bus where children are entering and/or exiting (i.e. where vehicles should not be passing). Once all of the video has been recorded a human must review the entire set of video to determine whether any violations (cars passing the stopped bus) have occurred. These video sequences are then extracted manually and used for evidence in generating tickets for these vehicles and/or drivers. This labor-intensive processing of the video sequences results in substantial additional costs for providing the school bus violation detection service. For instance, it may take 15-20 minutes to review a day's worth of footage for a single bus. Many school districts have large numbers of buses in their fleet (e.g., hundreds of buses). Thus, the costs for manually reviewing such large amounts of video footage can be prohibitive for more widespread deployment and adoption of these types of solutions.

The subject innovation provides improved methods and systems for automatically detecting moving vehicles that pass a stopped school bus in order to reduce manual video review and vehicle detection.

BRIEF DESCRIPTION

In one aspect, a computer-implemented method for identifying moving vehicles that illegally pass a school bus during a bus stop comprises receiving a video sequence from a camera device mounted on a school bus, and partitioning the video sequence into video segments such that each video segment corresponds to a single bus stop and comprises one or more video frames captured during the bus stop. The method further comprises analyzing each frame of each video segment to detect a moving vehicle in one or more of the frames, identifying and tagging frames in which a moving vehicle is detected, and identifying and tagging video segments that comprise tagged frames.

In another aspect, a system that facilitates identifying moving vehicles that illegally pass a school bus during a bus stop comprises a camera device that is mounted to a school bus and that records video whenever a stop sign coupled to the school bus is in a deployed position; wherein the camera is aimed to capture video of at least a portion of the deployed stops sign and of any moving vehicle that passes the school bus while the stop sign is deployed. The system further comprises a processor configured to execute stored computer-executable instructions for receiving a video sequence from the camera device, and for partitioning the video sequence into video segments such that each video segment corresponds to a single bus stop and comprises one or more video frames captured during the bus stop. The processor is further configured to execute instructions for analyzing each frame of each video segment to detect a moving vehicle in one or more of the frames, identifying and tagging frames in which a moving vehicle is detected, and for identifying and tagging video segments that comprise tagged frames.

In another aspect, a method of identifying moving vehicles that illegally pass a school bus during a bus stop comprises partitioning a video sequence recorded during a bus stop into video segments, analyzing each frame of the video segment to detect a moving vehicle in one or more of the frames, tagging a frame in which a moving vehicle is detected, and using automated license plate recognition (ALPR) to identify a license plate number and state of origin of a license plate on the moving vehicle. The method further includes appending the license plate number and state of origin to the tagged frame to generate a violation package, and transmitting the violation package to a law enforcement agency for review.

BRIEF DESCRIPTION OF THE DRAWINGS

The file of this patent contains at least one drawing executed in color. Copies of this patent with color drawing(s) will be provided by the United States Patent and Trademark Office upon request and payment of the necessary fee.

DETAILED DESCRIPTION

The systems and methods described herein can be utilized to analyze a video stream from a camera mounted on the side of a school bus, wherein a sub-set of video sequences showing cars illegally passing the stopped school bus are automatically identified through image and/or video processing. The described systems and methods provide a significant savings in terms of the amount of manual review that is required to identify such violations. The video sequences also can be analyzed further to additionally produce images of the license plate (for identification of the violator), thereby providing further reduction in required human processing and review time. In one embodiment, automatic license plate recognition (ALPR) is employed to identify text on the violator's license plate, as well as the state by which the license plate was issued, without requiring human review of the license plate image.

Figure 1:
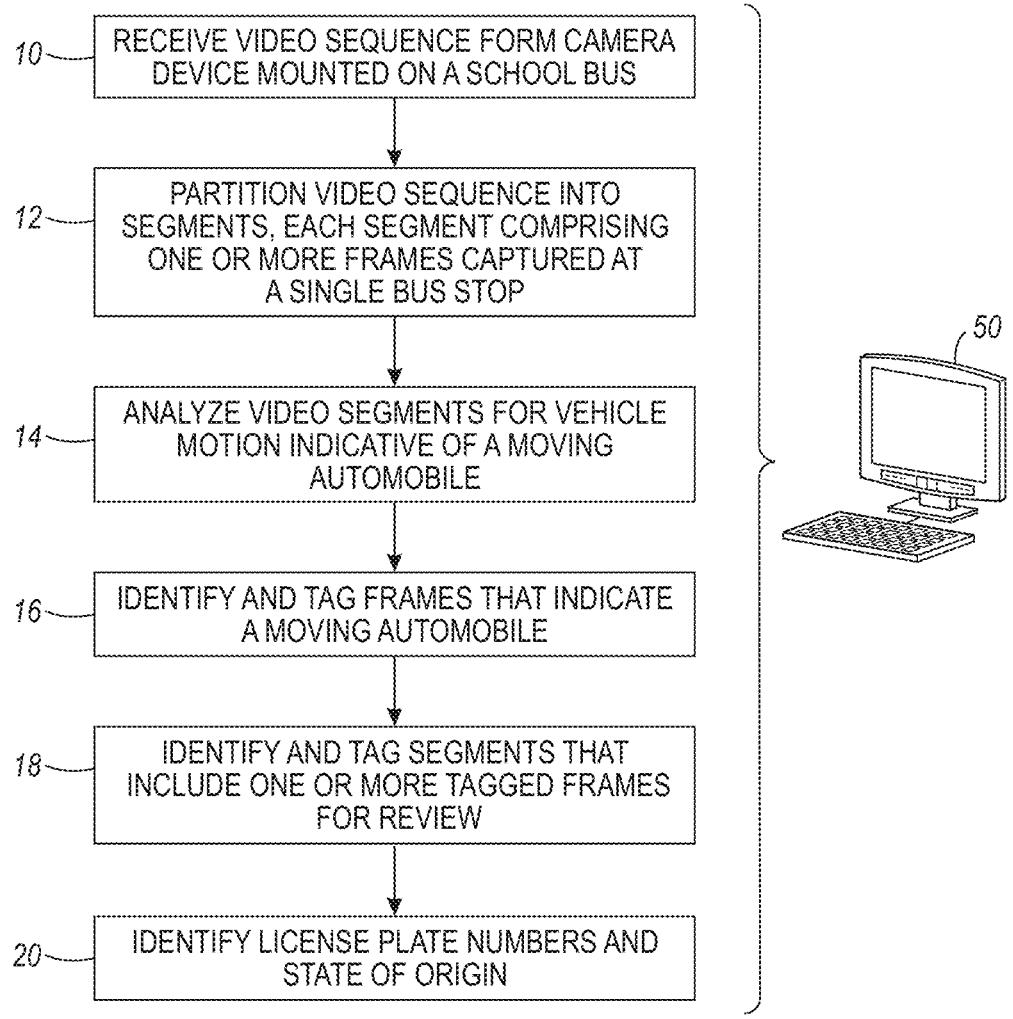
FIG. 1 illustrates a method for tagging or otherwise identifying video frames and/or segments that include an image of a vehicle that is moving past a stopped school bus, in accordance with various features described herein.

FIG. 1 illustrates a method for tagging or otherwise identifying video frames and/or segments that include an image of a vehicle that is moving past a stopped school bus, in accordance with various features described herein. At 10, a video sequence (i.e. recorded video data) is received or retrieved from a camera device mounted on a school bus.

The video is recorded continuously during school bus operation or periodically (e.g., when the "STOP" sign on the side of the school bus is extended during a bus stop). At 12, the video sequence is partitioned into segments, wherein each segment corresponds to a bus stop. Segmenting of the video segments may be performed by the camera device mounted on the school bus or remotely (i.e., on a computer or the like) once the video sequence has been received at the computer. At 14, the video segments are analyzed (e.g., automatically, manually, semi-automatically, etc. For instance, the video segments can be analyzed by a human operator manually, and/or by a computer program. At 16, frames within each segment that include an image of a moving vehicle (i.e., a vehicle that is moving past the bus while the STOP sign is extended), are detected, if present, and tagged or otherwise marked. At 18, segments including tagged frames are also tagged or otherwise marked as including an image of a moving vehicle for review and further analysis (e.g., by a human or automated program).

Once the segments of the video sequences with violations have been identified and tagged, images of the license plates for each of the violating vehicles are identified and extracted, at 20. For instance, automated license plate recognition (ALPR) technology can be employed to identify the state and plate number of vehicles, once the license plate image for the car passing the stopped school bus has been extracted, in order to mitigate or minimize human review. This feature provides an end-to-end solution for automating the violation detection and processing. The automatically-processed violation package is then sent to local law enforcement.

Additionally or alternatively, the plate numbers and state of origin information can be embedded in the video segment (e.g., as metadata) or included in a header or title for the tagged video segment. The violation package can then be forwarded to local law enforcement for review. This feature enables a human reviewer to quickly identify the license plate text and state of origin such that the appropriate vehicle and/or operator can be ticketed.

It will be appreciated that the various acts described with regard to the methods set forth herein may be performed in any order, and are not limited to the specific orderings set forth herein. Additionally, in some embodiments, fewer than all of the acts described with regard to the methods presented herein may be performed to achieve the desired results.

A computer 50 can be employed as one possible hardware configuration to support the systems and methods described herein. It is to be appreciated that although a standalone architecture is illustrated, any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 50 can include a processing unit (not shown) that executes, and a system memory (not shown) that stores, one or more sets of computer-executable instructions (e.g., modules, programs, routines, algorithms, etc.) for performing the various functions, procedures, methods, protocols, techniques, etc., described herein. The computer can further include a system bus (not shown) that couples various system components including the system memory to the processing unit. The processing unit can be any of various commercially available processors. Dual microprocessors and other multi-processor architectures also can be used as the processing unit.

As used herein, "module" refers to a set of computer-executable instructions (e.g., a routine, program, algorithm, application, etc., persistently stored on a computer-readable medium (e.g., a memory, hard drive, disk, flash drive, or any other suitable storage medium). Moreover, the steps of the methods described herein are executed by a computer unless otherwise specified as being performed by a user.

The computer 50 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through a keyboard (not shown), a pointing device (not shown), a mouse, thumb pad, voice input, stylus, touchscreen, etc. The computer 50 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

In one embodiment, the method of FIG. 1 employs video and/or imaging processing techniques to analyze the video sequences for the school buses. The video sequences are segmented at 12 such that each segment contains the frames captured in one bus stop. This can be accomplished by exploiting a recording triggering signal, or by the timestamps for the frames and correlating the timestamps to known deployment and retraction times for the stop sign. According to an example, only those segments in which a passing car (i.e. a violator) is detected are extracted for review at 16 and 18. These segments can then be used as evidence in generating tickets through local law enforcement agencies. A variety of processing techniques can be utilized to detect violating cars in the video sequences. Several examples of processing algorithms are summarized below.

Figure 2:
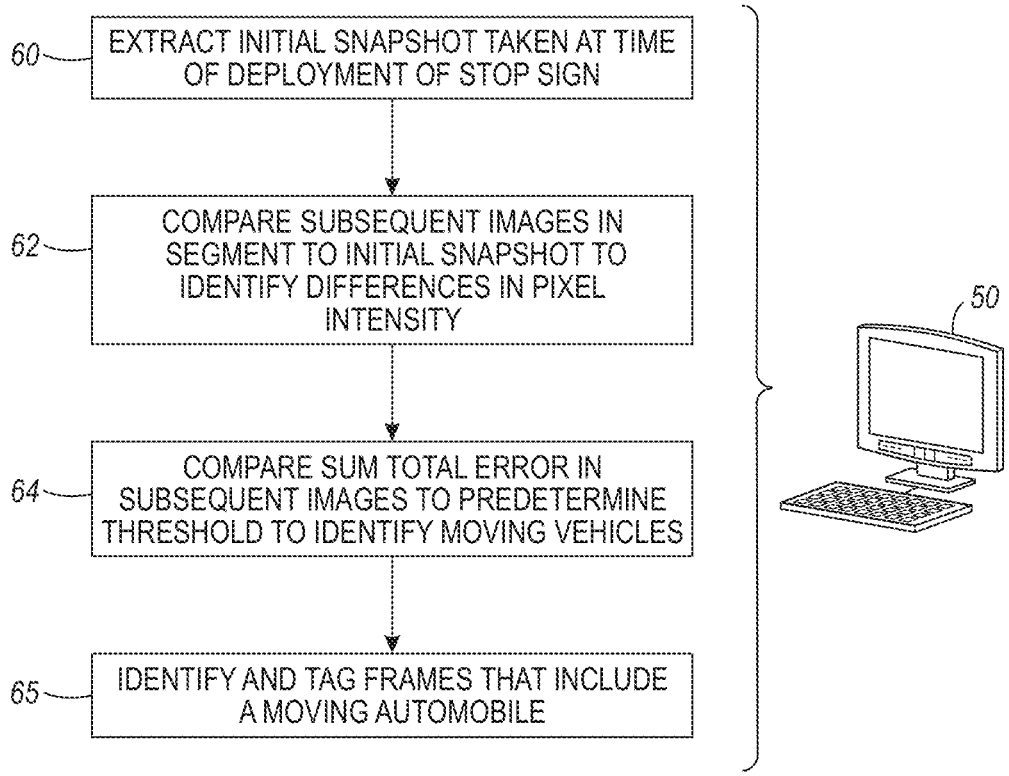
FIG. 2 illustrates a method of identifying video segments and identifying frames with moving vehicles in them

FIG. 2 illustrates a method of identifying video segments and identifying frames with moving vehicles in them, as set forth with regard to 14 and 16 of FIG. 1, which is performed by identifying large "deltas" or differences in the positions vehicles in the image frames. At 60, a snapshot of the image frame ($I_{reference}$) taken when the stop sign is initially deployed (e.g., it is assumed that no vehicle is passing the bus at this point) is extracted. Although a full color (RGB) image can be processed using the described systems and methods, a gray level intensity image is considered for the purposes of the described examples. At 62, subsequent image frames, which are captured until the stop sign is retracted, are then compared to this reference image, such that:

$$I_{delta}(x,y,k) = \text{abs}(I_{reference}(x,y) - I_{frame}(x,y,k)),$$
$$k=1,2,\ldots$$

where x and y are the pixel coordinates (row and column) within an image and k is the image frame index relative to the reference frame location. $I_{frame}$ is the image frame being compared to the reference frame, and $I_{delta}$ is the difference between the reference and image frames. When a vehicle passes the stopped bus, the pixel-by-pixel intensity differences between the reference image frame and the subsequent image frame increases.

The presence or absence of a car in the video sequence is then determined, at 64, by comparing the sum total error for each subsequent image frame to a predetermined threshold value:

$$M_{present}(k) = \begin{cases} 1, & \sum_{x=1;L,y=1;N} I_{diff}(x,y,k) > M_{thresh} \\ 0, & \text{otherwise} \end{cases}$$

where $M_{present}(k)$ signifies whether a violating car is present within frame k, $M_{thresh}$ is the predetermined threshold value for the difference metric, and L and N are the number of rows and columns in the sub-images, respectively. Using the resulting sequence of values $M_{present}$, the key regions (e.g., one or more frames) of the video sequence with violations present are then automatically extracted, at 66.

Figure 3:
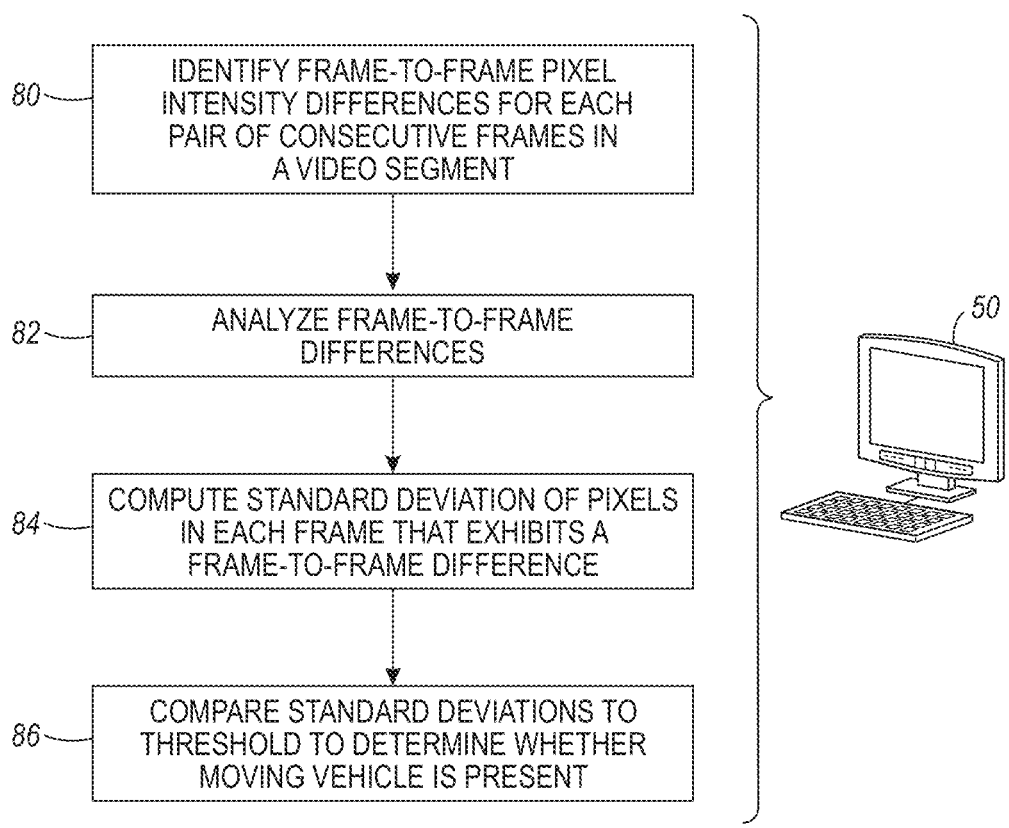
FIG. 3 illustrates a method for identifying video segments and identifying frames with moving vehicles in them.

FIG. 3 illustrates a method for identifying video segments and identifying frames with moving vehicles in them, as set forth with regard to 14 and 16 of FIG. 1. At 80, the frame-to-frame differences between consecutive image frames in the video sequences are first calculated for each video segment such that:

$$I_{delta}(x,y,k) = \text{abs}[I_{frame}(x,y,k) - I_{frame}(x,y,k-1)],$$
$$k=1,2,\ldots$$

where x and y are the pixel coordinates (row and column) within an image and k is the image frame index, and where $I_{delta}$ represents the difference in pixel values between frames and $I_{frame}$ represents a given frame. These frame-to-frame difference images can then be analyzed, at 82, to detect the present or absence of a passing vehicle. If there is not a passing car, then minimal delta values occur at each pixel location of the difference images. However, as a vehicle passes through the scene, large difference or delta values occur. Since the gray level intensity image of a vehicle is not uniform, these differences are present throughout the passing of the car, not just during the entry and exit of the vehicle from the scene. At 84, the presence or absence of a passing car is determined computing the standard deviation of all pixels within each of the difference images $I_{delta}$:

$$M_{std}(k) = \text{std}(I_{delta}(1:L,1:N,k)).$$

This metric is then compared to a threshold value to determine, at 86 whether or not a passing vehicle is present in the image frame:

$$M_{present}(k) = \begin{cases} 1, & M_{std}(k) > M_{thresh\_std} \\ 0, & \text{otherwise} \end{cases}$$

where $M_{thresh\_std}$ is a predetermined threshold value. Once again, using the resulting sequence of values $M_{present}$, the key regions of the video sequence with violations present can then be automatically extracted.

According to another example, additional metrics, such as the sum of the pixel values for each delta image, can also be used. For instance:

$$M_{sum}(k) \sum_{\substack{x=1,2,\ldots L \\ y=1,2,\ldots N}} I_{delta}(x,y,k)$$

$$M_{present}(k) = \begin{cases} 1, & M_{sum}(k) > M_{thresh\_sum} \\ 0, & \text{otherwise} \end{cases}$$

This approach highlights image frames where large changes occurred since the last frame. Combinations of these metrics can also be used to identify passing cars in the video sequence. For instance:

$$M_{present}(k) = \begin{cases} 1, & M_{sum}(k) > M_{thresh\_sum} \text{ and } M_{std}(k) > M_{thresh\_std} \\ 0, & \text{otherwise} \end{cases}.$$

Additionally or alternatively, a number of other techniques can be used to analyze the video stream to detect a passing car. For example, if the video is represented in MPEG format, then motion vectors in the region of interest can be directly and efficiently extracted from the P and B frames. An aggregate metric calculated from these motion vectors can be used to identify motion, and thus a violation. For instance, when analyzing the frames the method can further include obtaining motion vectors for the frames within the video segment, calculating a sum total of the magnitude of the motion vectors within each frame, comparing the sum total motion vector magnitude within each frame to a predetermined threshold value, and identifying frames that have a sum total motion vector magnitude greater than the predetermined threshold value as having an image of a moving vehicle.

Figure 4:
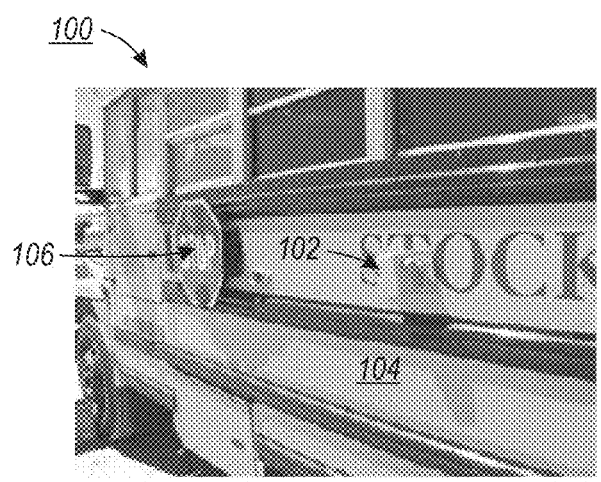
FIG. 4 shows an image of a camera device mounted to a school bus.

FIG. 4 shows an image 100 of a camera device 102 that is mounted to a school bus 104. The device is pointed toward a stop sign 106 that is deployed when the bus stops. The device 102 can be wired to the stop sign control system so that it begins recording upon deployment of the stop sign and stops recording upon retraction of the stop sign.

Figure 5:
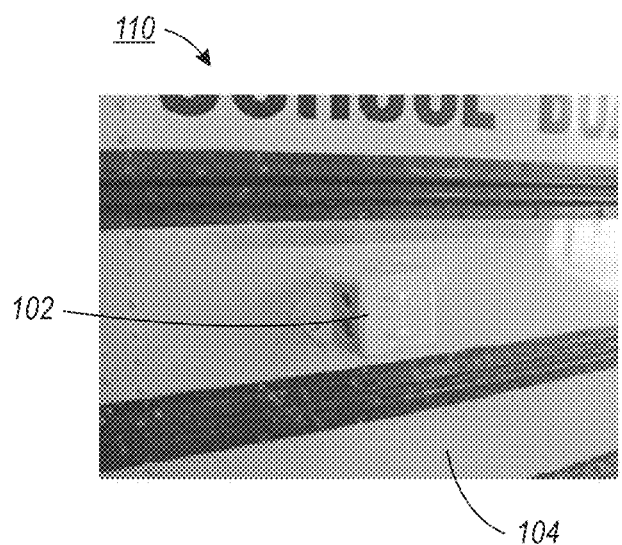
FIG. 5 shows an image of the camera device mounted to the school bus.

FIG. 5 shows an image 110 of the camera device 102 mounted to the school bus 104. The camera device is angled slightly downward relative to level, so that the camera can capture video frames of vehicles as they pass the bus while the stop sign is deployed.

Figure 6:
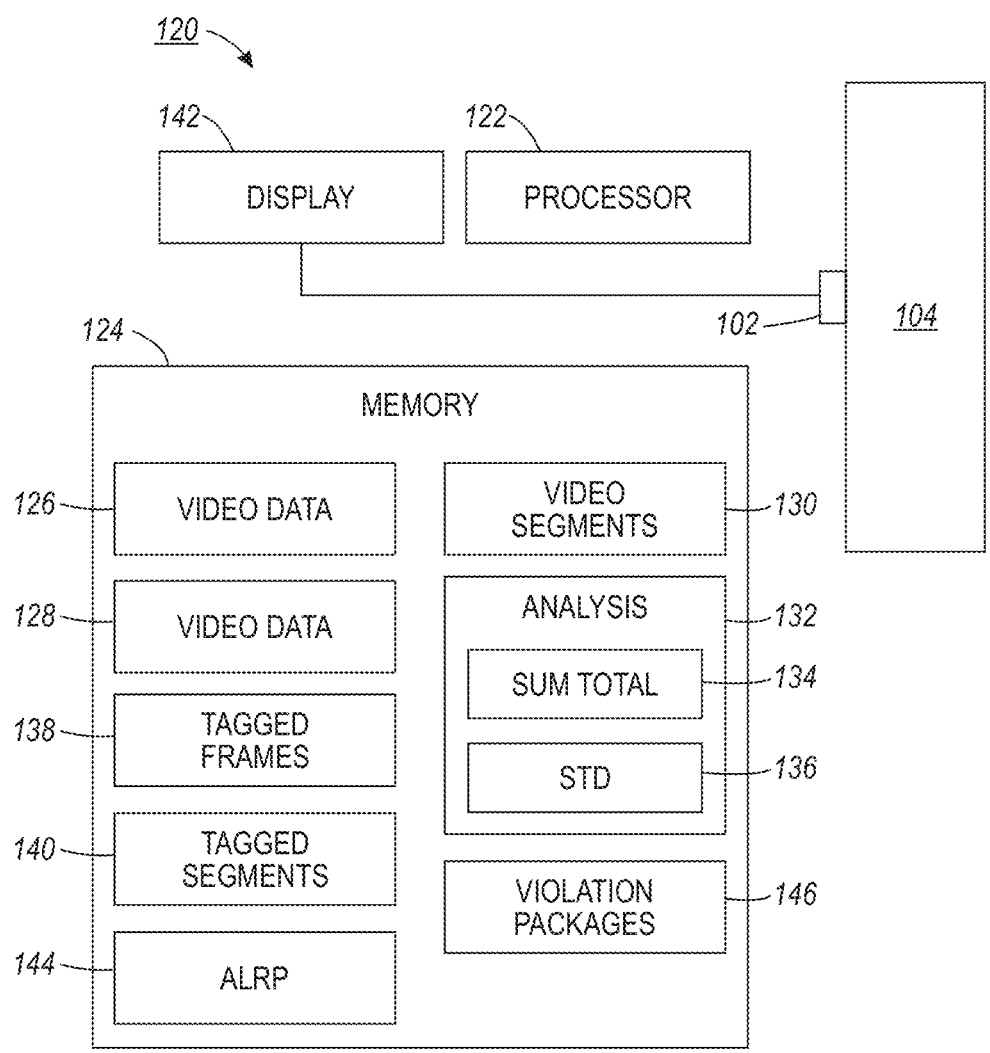
FIG. 6 illustrates a system that facilitates detecting and identifying moving vehicles that pass a school bus while the stop sign is deployed, in accordance with various aspects described herein.

FIG. 6 illustrates a system 120 that facilitates detecting and identifying moving vehicles that pass a school bus while the stop sign is deployed, in accordance with various aspects described herein. The system includes a camera device 102, which is mounted on a school bus 104. The system also includes a processor 122 that executes, and a memory 124 that stores, computer-executable instructions or "modules" for carrying out the various functions described herein. In one embodiment, the processor and memory reside in a computer that is remote from the camera device. Acquired video data is retrieved from the camera device wirelessly (e.g., over a suitable wireless connection) or over a wired connection (e.g., a technician or law enforcement office connects the computer or a storage device such as a memory stick to the camera device and downloads the video data, which is then stored in the memory of the computer). In another embodiment, the processor 122 and memory 124 are integral to the camera device and the here-in describe functionality is performed at the camera device.

Video data 126 recorded by the camera device 102 is stored in the memory 124. The video data is recorded continuously during school bus operation or periodically (e.g., when the "STOP" sign on the side of the school bus is extended during a bus stop). The processor 122 executes a partitioning module 128 (i.e., a set of computer-executable instructions) that partitions the video data 126 into video segments 130. Each segment corresponds to a bus stop, and comprises a plurality of video image frames taken from the time a stop sign on the bus is deployed until the stop sign is retracted. The processor executes an analysis module 132 that analyzes the video segments to detect or identify moving vehicles that illegally pass the school bus while the stop sign is deployed. The analysis module 132 includes a sum total module 134 that is executed by the processor to perform the method described with regard to FIG. 2. Additionally or alternatively, the analysis module 132 includes a standard deviation module 136 that is executed by the processor to perform the method described with regard to FIG. 3. Using either or both of the sum total module 134 and the standard deviation module 136, the processor 122 identifies video frames that show a vehicle illegally passing the school bus during a stop. The tagged frames 138 are stored in the memory 124, and the processor additionally tags and stores tagged video segments 140 that include the tagged frames. In one embodiment, the tagged segments are presented on a display 142 for review by a human technician such as a school employee or law enforcement personnel, and may be used to identify and penalize the driver or owner of the vehicle that committed the violation.

In another embodiment, once the segments of the video sequences with violations have been identified and tagged, images of the license plates for each of the violating vehicles are identified and extracted. For instance, the processor 122 executes an automated license plate recognition (ALPR) module 144 that identifies the license plate number of vehicles and the state of origin, in order to mitigate or minimize human review. This feature provides an end-to-end solution for automating the violation detection and processing. The plate numbers and state of origin information can be embedded in the video segment data (e.g., as metadata), included in a header or title for the tagged video segment, and/or otherwise associated with or appended to the tagged segment(s) to create a "violation package" that can be sent to or directly downloaded by local law enforcement. This feature enables a human reviewer to quickly identify the license plate text and state of origin such that the appropriate vehicle and/or operator can be ticketed.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for identifying moving vehicles that illegally pass a school bus during a bus stop, comprising:
    receiving a video sequence from a camera device mounted on a school bus;
    partitioning the video sequence into video segments such that each video segment corresponds to a single bus stop and comprises one or more video frames captured during the bus stop;
    analyzing the frames within each video segment to detect a moving vehicle in one or more of the frames;
    identifying and tagging frames in which a moving vehicle is detected;
    identifying and tagging video segments that comprise tagged frames;
    for each detected moving vehicle, locating a license plate on the moving vehicle;
    identifying license plate information comprising the alphanumeric characters on the license plate and the state of origin of the license plate; and
    appending metadata, which describes the license plate information, to at least one of the tagged segment and the tagged frame in which the license plate information is identified to generate a violation package;
    wherein detecting the moving vehicle comprises:
        comparing an initial frame in a video segment to subsequent frames in the video segment to identify differences in pixel intensity;
        calculating a sum total error for pixels in each subsequent frame;
        comparing the sum total error for each subsequent frame to a predetermined threshold value as a function of the equation:

$$M_{present}(k) = \begin{cases} 1, & \sum_{x=1:L, y=1:N} I_{diff}(x, y, k) > M_{thresh} \\ 0, & \text{otherwise} \end{cases}$$

where $M_{present}(k)$ signifies whether a violating vehicle is present within frame k, $I_{diff}(x, y, k)$ is the difference between the initial and k-th frames in the segment, $M_{thresh}$ is the predetermined threshold value for the difference metric, and L and N are the number of rows and columns in the subsequent frames, respectively;
        identifying frames that have a sum total error greater than the predetermined threshold value; and
        tagging the identified frames as having an image of a moving vehicle.

2. The method according to claim 1, further comprising:
    providing the violation package to a law enforcement organization.

3. The method according to claim 1, wherein detecting the moving vehicle comprises:
    calculating frame-to-frame pixel intensity differences between each pair of consecutive frames in each video segment;
    computing a standard deviation value for pixels in each frame that exhibits a frame-to-frame difference; comparing the standard deviation values to a predetermined threshold value to identify a frame that include an image of a moving vehicle; and
    tagging the identified frame as having an image of a moving vehicle.

4. The method according to claim 3, wherein the frame-to-frame pixel intensity differences between consecutive image frames in the video segments are calculated as a function of the equation:

$$I_{delta}(x,y,k) = \text{abs}[I_{frame}(x,y,k) - I_{frame}(x,y,k-1)],$$
$$k = 1, 2, \ldots$$

where x and y are the pixel coordinates (row and column) within an image and k is the image frame index, and where $I_{delta}$ represents the difference in pixel values between frames and $I_{frame}$ represents a given frame.

5. The method according to claim 1, wherein the camera device records the video sequence periodically by starting to record upon deployment of a stop sign mounted on the school bus and terminating recording upon retraction of the stop sign to the school bus, and wherein partitioning the video sequence into segments is performed as a function of a structure of the video sequence, such that each segment begins at a deployment of the stop sign and ends at a retraction of the stop sign.

6. The method according to claim 1, wherein partitioning the video is performed using timestamp information associated with the video frames and matching the time stamp information to known times of deployment and retraction of a stop sign coupled to the school bus.

7. The method according to claim 1, wherein analyzing the frames further comprises:
   obtaining motion vectors for the frames within the video segment;
   calculating a sum total of the magnitude of the motion vectors within each frame;
   comparing the sum total motion vector magnitude within each frame to a predetermined threshold value;
   identifying frames that have a sum total motion vector magnitude greater than the predetermined threshold value as having an image of a moving vehicle.

8. A system that facilitates identifying moving vehicles that illegally pass a school bus during a bus stop, comprising:
   a camera device that is mounted to a school bus and that records video whenever a stop sign coupled to the school bus is in a deployed position; wherein the camera is aimed to capture video of at least a portion of the deployed stops sign and of any moving vehicle that passes the school bus while the stop sign is deployed; and
   a processor configured to execute stored computer-executable instructions for:
      receiving a video sequence from the camera device;
      partitioning the video sequence into video segments such that each video segment corresponds to a single bus stop and comprises one or more video frames captured during the bus stop;
      analyzing the frames within each video segment to detect a moving vehicle in one or more of the frames;
      identifying and tagging frames in which a moving vehicle is detected;
      identifying and tagging video segments that comprise tagged frames;
      for each detected moving vehicle, locating a license plate on the moving vehicle;
      identifying license plate information comprising the alphanumeric characters on the license plate and the state of origin of the license plate; and
      appending metadata, which describes the license plate information, to at least one of the tagged segment data and the tagged frame data in which the license plate information is identified to generate a violation package;
      wherein to detect the moving vehicle, the processor executes instructions for:
         comparing an initial frame in a video segment to subsequent frames in the video segment to identify differences in pixel intensity;
         calculating a sum total error for pixels in each subsequent frame;
         comparing the sum total error for each subsequent frame to a predetermined threshold value using the equation:

$$M_{present}(k) = \begin{cases} 1, & \sum_{x=1:L, y=1:N} I_{diff}(x, y, k) > M_{thresh} \\ 0, & \text{otherwise} \end{cases}$$

where $M_{present}(k)$ signifies whether a violating vehicle is present within frame k, $I_{diff}(x, y, k)$ is the difference between the initial and k-th frames in the segment, $M_{thresh}$ is the predetermined threshold value for the difference metric, and L and N are the number of rows and columns in the subsequent frames, respectively;
         identifying frames that have a sum total error greater than the predetermined threshold value; and
         tagging the identified frames as having an image of a moving vehicle.

9. The system according to claim 8, wherein the processor executes instructions for:
   transmitting the violation package to a law enforcement organization.

10. The system according to claim 8, wherein to detect the moving vehicle, the processor executes instructions for:
   calculating frame-to-frame pixel intensity differences between each pair of consecutive frames in each video segment;
   computing a standard deviation value for pixels in each frame that exhibits a frame-to-frame difference; comparing the standard deviation values to a predetermined threshold value to identify a frame that include an image of a moving vehicle; and
   tagging the identified frame as having an image of a moving vehicle.

11. The system according to claim 10, wherein the frame-to-frame pixel intensity differences between consecutive image frames in the video segments are calculated by the processor as a function of the equation:

$I_{delta}(x,y,k) = abs[I_{frame}(x,y,k) - I_{frame}(x,y,k-1)]$, $k=1,2,\ldots$ where x and y are the pixel coordinates (row and column) within an image and k is the image frame index, and where $I_{delta}$ represents the difference in pixel values between frames and $I_{frame}$ represents a given frame.

12. The system according to claim 8, wherein the camera device records the video sequence periodically by starting to record upon deployment of a stop sign mounted on the school bus and terminating recording upon retraction of the stop sign to the school bus, and wherein partitioning the video sequence into segments is performed as a function of a structure of the video sequence, such that each segment begins at a deployment of the stop sign and ends at a retraction of the stop sign.

13. The system according to claim 8, wherein partitioning the video is performed using timestamp information associated with the video frames and matching the time stamp information to known times of deployment and retraction of a stop sign coupled to the school bus.

14. The system according to claim 8, wherein when analyzing the frames, the processor executes stored computer-executable instructions for:

obtaining motion vectors for the frames within the video segment;
calculating a sum total of the magnitude of the motion vectors within each frame;
comparing the sum total motion vector magnitude within each frame to a predetermined threshold value;
identifying frames that have a sum total motion vector magnitude greater than the predetermined threshold value as having an image of a moving vehicle.

15. A method of identifying moving vehicles that illegally pass a school bus during a bus stop, comprising:
partitioning a video sequence recorded during a bus stop into video segments;
analyzing each frame of the video segment to detect a moving vehicle in one or more of the frames;
tagging a frame in which a moving vehicle is detected;
using automated license plate recognition (ALPR) to identify a license plate number and state of origin of a license plate on the moving vehicle;
appending metadata describing the license plate number and state of origin to the tagged frame data to generate a violation package; and
transmitting the violation package to a law enforcement agency for review;
wherein analyzing each frame of the video further comprises:

comparing an initial frame in a video segment to subsequent frames in the video segment to identify differences in pixel intensity;
calculating a sum total error for pixels in each subsequent frame;
comparing the sum total error for each subsequent frame to a predetermined threshold value as a function of the equation:

$$M_{present}(k) = \begin{cases} 1, & \sum_{x=1:L, y=1:N} I_{diff}(x, y, k) > M_{thresh} \\ 0, & \text{otherwise} \end{cases}$$

where $M_{present}(k)$ signifies whether a violating vehicle is present within frame k, $I_{diff}(x, y, k)$ is the difference between the initial and k-th frames in the segment, $M_{thresh}$ is the predetermined threshold value for the difference metric, and L and N are the number of rows and columns in the subsequent frames, respectively;
identifying frames that have a sum total error greater than the predetermined threshold value; and
tagging the identified frames as having an image of a moving vehicle.

* * * * *